UNITED STATES PATENT OFFICE.

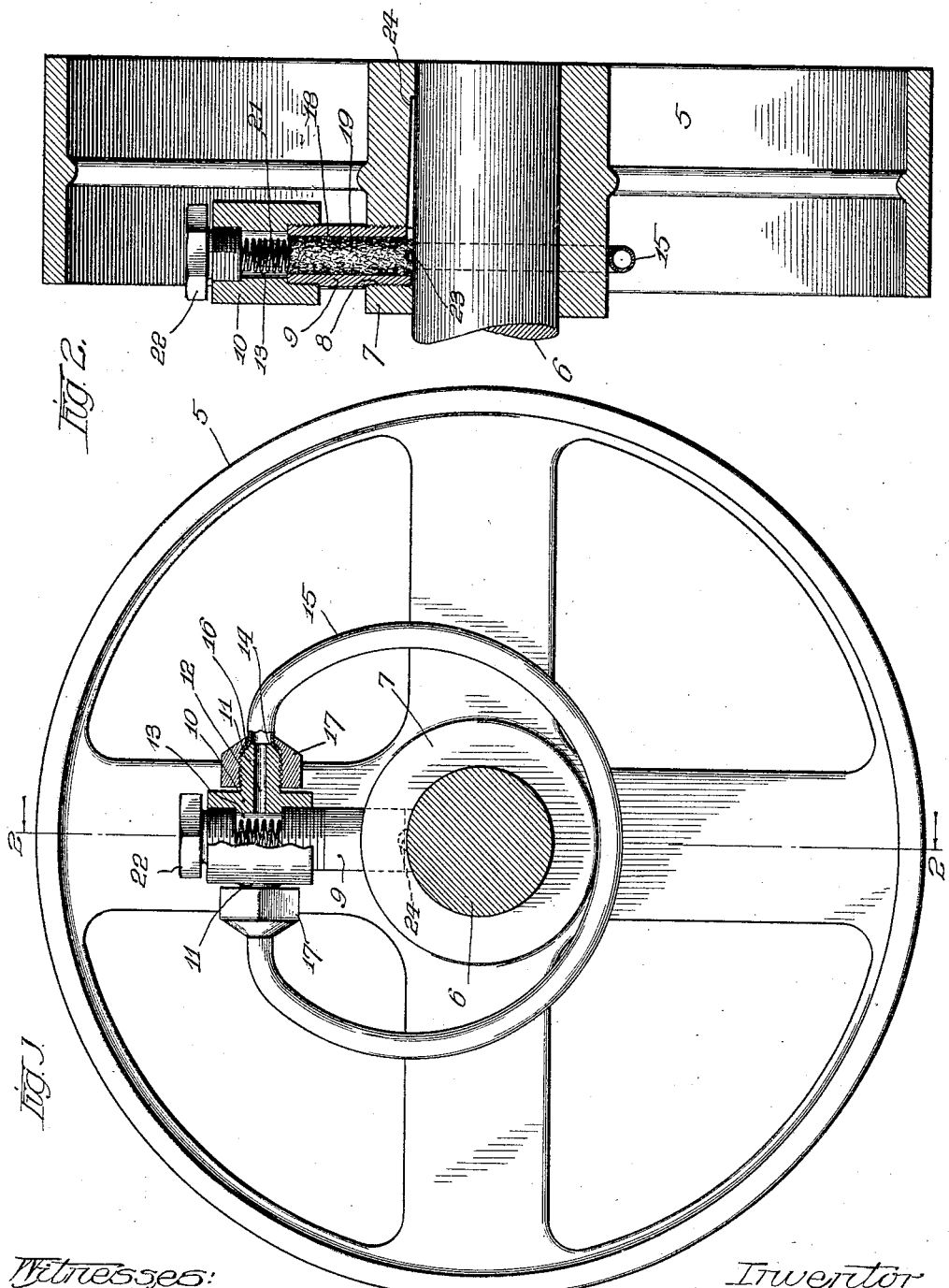

HOMER N. MOTSINGER, OF LA FAYETTE, INDIANA.

OILING DEVICE.

1,067,670.  Specification of Letters Patent.  Patented July 15, 1913.

Application filed November 25, 1911. Serial No. 662,391.

*To all whom it may concern:*

Be it known that I, HOMER N. MOTSINGER, a citizen of the United States, residing at La Fayette, in the county of Tippecanoe and State of Indiana, have invented certain new and useful Improvements in Oiling Devices, of which the following is a specification.

My invention relates to improvements in oiling devices for lubricating loose pulleys. One of the objects of my invention is to provide an oiler for loose pulleys that will supply sufficient lubrication, at all times, to the shaft upon which loose pulleys revolve without waste of the lubricant, and which at the same time shall be of advantageous construction adaptable for cheap manufacture, easy assemblage, durability in use, and efficiency in operation.

Another object is to attain these results by the provision of novel parts including a fitting peculiarly constructed for combination with an oil-containing tube of suitable construction.

Other and further objects of my invention will readily become apparent to persons skilled in the art from a consideration of the following description, taken in conjunction with the drawing wherein:

Figure 1 is an end view of a pulley showing my lubricating device applied thereto; and, Fig. 2 is a central, transverse section, taken on line 2—2 of Fig. 1.

In both views the same reference characters indicate similar parts.

The pulley 5 is designed to run loose upon the shaft 6, and it is required to lubricate the contacting surfaces presented by the pulley bore and the inclosed shaft, which result my device is intended to accomplish. The hub 7 of the pulley is perforated as at 8, and said perforation is screw threaded, as usual in such pulleys, for reception of the lubricating device.

My lubricating device comprises essentially a screw threaded nipple 9, for insertion in the threaded bore 8 of the pulley. A cap part fitting 10, which is shown as a separable part from the nipple 9, is provided with laterally projecting screw threaded arms 11, 11. These arms are perforated as at 12 into the central bore 13. The arms are each provided with tapered seats 14, on the ends. An oil containing tube 15 has both its ends expanded, as at 16, for contact with said seats. The tube is sufficiently long to extend around the hub 7 and is of capacity to hold a supply of oil necessary to afford the required lubrication for a considerable period of time. The ends are expanded after nuts 17—17 have first been threaded over the tube. The fitting 9—10 is screwed into the hub 7 of the pulley, then the tube 15 is placed in position and around the hub and the nuts 17—17 screwed on to the arms 11—11, whereby the ends of the tube are caused to make liquid-tight contact with the seats 16—16 provided on the ends of the arms. This provides a continuous oil-containing receptacle which has communication with the bore 13 in the fitting 10 and bore 18 in the nipple 9. The bore 18 contains a fibrous wick 19, which is held in contact with the shaft 6 by means of a compression spring 21, which abuts at its upper end against a closure plug 22.

When the device has been put in place on the pulley the plug 22 is removed and the entire interior thereof is filled with oil. The rotation of the wheel 5 causes the wick 19 to become and remain saturated with oil, from the lower end of which it is delivered to the shaft. A groove 24 is preferably cut in the bore of the pulley leading from the bore 18 to the opposite end of the hub 7 better to distribute the oil over the entire bearing surface of the hub bore. With larger pulleys having long hubs two or more lubricating devices may be used.

My device is especially valuable in its use with rotating parts that are difficult of access, such as in loose pulleys that are located between two fixed pulleys on a shaft, as one filling will be sufficient for all practical purposes for many months. Another feature of value is that the oil is practically hermetically sealed and is not subject to atmospheric changes and effects; being dust-tight and liquid-tight it is neat and efficient, and obviously the use of the fitting described in combination with the tube makes a lubricator of greater simplicity, durability, and convenience than previous constructions using oil-containing tubes.

I do not claim to be the first to utilize ring-shaped oil containers mounted upon the pulley, but merely the improvement therein in the above particulars which I have effected by means of the combination of structural parts defined in the appended claims.

What I claim is:

1. In a device of the character described, a cruciform integral fitting having each of its four arms hollow, opposite vertical arms being interiorly threaded and opposite lateral arms being exteriorly tapered and threaded, means in one vertical arm for oil-communicating engagement with the hub of a pulley, nuts on the lateral arms having interior tapering surfaces, a long metal tube having its ends expanded and engaged between said coacting tapering surfaces of the nuts and lateral arms, and a closure in the other vertical arm.

2. In a device of the character described, a cruciform integral fitting having a relatively large bore extending through its vertical arms and a transverse intersecting bore through its lateral arms, a closure for one end of said larger bore, means at the other end to support said fitting upon the hub of a pulley for communication between said hub and said larger bore, a longitudinal hub-encircling tube having each of its two ends formed for coaction with a tube-attaching means, and tube-attaching means upon each said lateral arm of the fitting.

3. In a device of the character described, an integral fitting having opposite vertical arms, said fitting and arms having a bore extending therethrough, means associated with one said arm for support of the fitting by engagement with the hub of a pulley, a closure engageable in the other arm, a spring at one end abutting against said cover, a wick between the other end of the spring and the hub, and circular oil containing tube carried by the fitting.

4. In a device of the character described, a fitting for engagement in a radial bore in the hub of a pulley, said fitting having a hollow interior, lateral exteriorly screw-threaded and interiorly bored arms projecting from said fitting, and a threaded end member having a bore therein, a tube, nuts securing the ends of the tube to said laterally projecting arms, a wick in said fitting, a closure for the end member of the fitting, and a resilient member between the wick and the closure.

In testimony whereof I hereunto set my hand in the presence of two witnesses.

HOMER N. MOTSINGER.

In the presence of—
MILDRED PECHIN,
ANDREW J. DILLON.

---

Copies of this patent may be obtained for five cents each, by addressing the "Commissioner of Patents, Washington, D. C."